Figure 2:
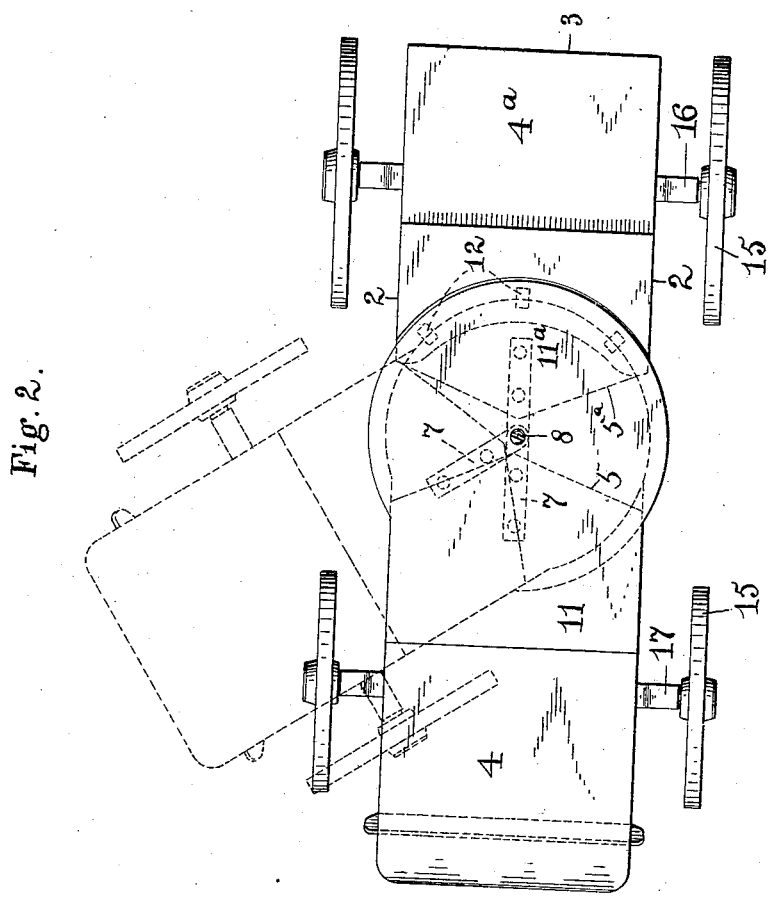

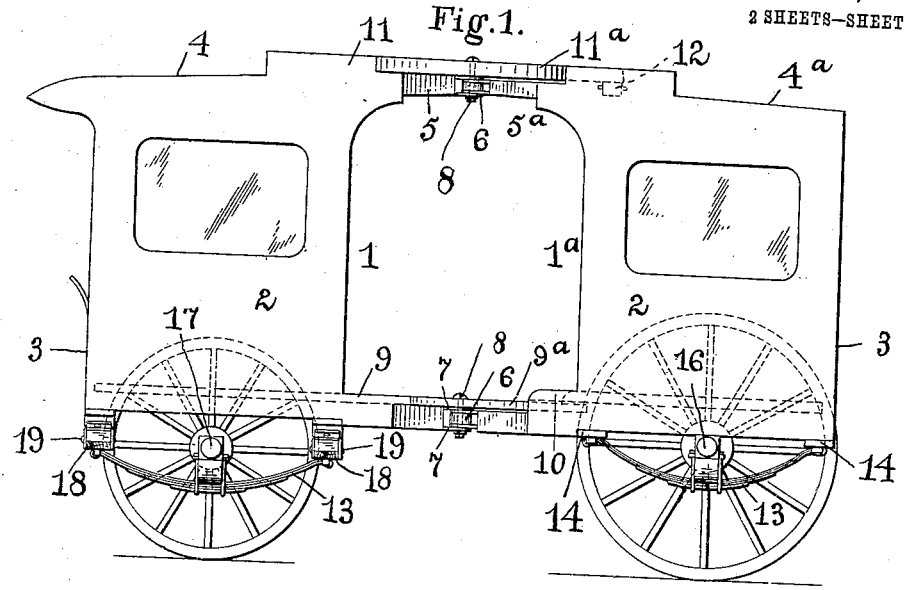
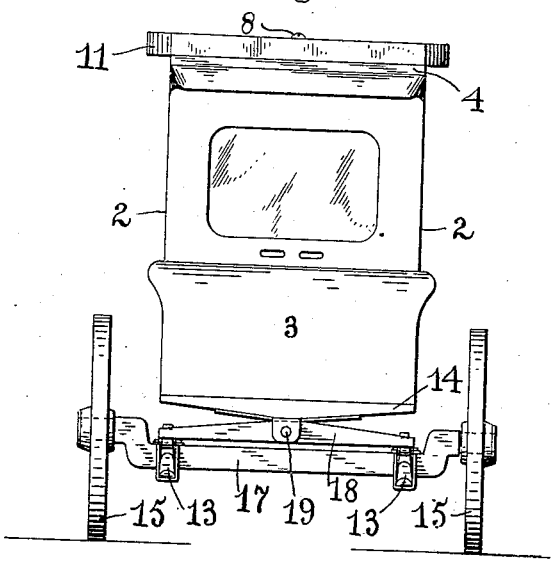

J. R. HOLLAND & H. SILVER.
DELIVERY WAGON.
APPLICATION FILED APR. 20, 1908.

914,722.

Patented Mar. 9, 1909.
2 SHEETS—SHEET 2.

Attest:
Ed. L. Folson.
Bent. M. Stahl.

Inventors:
Joseph R. Holland,
Harry Silver,
By Shear Middleton Donaldson & Shear
Attys.

UNITED STATES PATENT OFFICE.

JOSEPH R. HOLLAND AND HARRY SILVER, OF BINGHAMTON, NEW YORK.

DELIVERY-WAGON.

No. 914,722.  Specification of Letters Patent.  Patented March 9, 1909.

Application filed April 20, 1908. Serial No. 428,210.

*To all whom it may concern:*

Be it known that we, JOSEPH R. HOLLAND and HARRY SILVER, citizens of the United States, residing at Binghamton, New York, have invented certain new and useful Improvements in Delivery-Wagons, of which the following is a specification.

Our invention relates to improvements in delivery wagons for the use of dairy men, butchers, bakers, and the like.

We have aimed to provide a wagon which will be capable of turning in extremely narrow streets, which will be strong and durable and avoid the use of the reach and circle of the ordinary running gear, which will travel over uneven ground without strain upon the parts, in which a maximum space within the vehicle may be used for storage and yet the entire contents be readily accessible through a wide opening on one side or the other, which openings when the vehicle is traveling straight ahead will be of less size, the entire top of the body of the vehicle being covered to prevent the entrance of rain or snow.

With these and possibly other objects in view, our invention includes the features of construction and arrangements of parts hereinafter described and particularly set forth in the appended claim.

An embodiment of the invention is illustrated in the accompanying drawings, in which,—

Figure 1 is a side elevation. Fig. 2 a plan view, with the parts shown in the position assumed when traveling straight ahead in full lines and making a turn to one side in dotted lines. Fig. 3 is a front elevation.

Referring by reference characters to this drawing, it will be seen that the body of the vehicle is composed of two main parts numbered respectively 1, 1$^a$. These two parts in the main may be duplicates of each other, being provided with sides 2 and front and rear or end portions 3, which may have window openings closed by glass sashes or celluloid curtains, as desired and in the manner well understood by those familiar with vehicle construction.

Each of the sections 1, 1$^a$, is provided with a top portion as indicated at 4—4$^a$, respectively, these top portions sloping toward the outer ends. The portions of these top portions where they approach each other are converging toward the center, as indicated at 5—5$^a$, the angle of convergence depending upon the shortness with which it is desired to turn the vehicle. The apices of these portions are hinged together, as shown by hinges 6, which may conveniently be formed by metal bars 7 bolted to the upper and lower faces of the top and bottom portions respectively, overlapping each other and connected by bolts 8. This provides a body of two sections pivotally connected together at top and bottom and it is only necessary to rigidly connect the front and rear wheels to the front and rear portions of the body respectively to provide a vehicle which may be turned within a very short space, which in addition to the many advantages offered in connection with the construction of the body, simplifies greatly the manner of attaching the wheels. In order to form a practically continuous floor space and roof for the body we provide the following parts:— The floor 9 of one section is carried rearwardly to overlap the lower converging part of the other body section, and such extended portion 9$^a$ is curved on an arc concentric with the hinge pin and has its edge traveling in a groove or channel between the converging portion of the other body part and the floor 10 thereof. In a similar manner, the front top portion 11 has a part rigidly carried thereby and extending over the other or rear body portion, this extended portion 11$^a$ having its edge curved on an arc concentric with the upper hinge pin, and it is preferable that this upper portion 11$^a$ be made of a diameter exceeding the width of the body and which thereby projects over the side openings and assists in shielding them.

The curved edge of the part 11$^a$ need not rest in a groove as does the corresponding lower part, but simply in a countersunk portion. The said curved edges on the upper and lower parts are preferably arranged to travel in contact with anti-friction devices, such as rollers, as indicated at 12. The wheels and axles may be secured in any convenient manner. As an example of the manner in which the rear wheels may be secured we have shown semi-elliptic springs 13 having their ends suitably connected to the cross sills 14 of the body, the wheels 15 being journaled upon axles 16 connected with the springs. In order to avoid twisting strain we connect the axles 17 of the front wheels to similar semi-elliptic springs, the ends of which are connected to rocking bars 18, which are pivotally connected to the underside of the front portion by longitudinally disposed pivots 19, as shown.

From the foregoing description it is thought that all of the advantages of our construction will be evident and that it will not be necessary to set them forth in detail. The simplicity of construction is apparent, as also the narrowness of the space within which the vehicle may be turned. Furthermore, it will be seen that both ends of the vehicle may be utilized for the storage of goods, which are accessible from the center through an extremely wide opening as when it is desired to load and unload the vehicle it is only necessary to turn it so as to widen the opening on the side where the goods are located when the vehicle may be easily loaded and the goods as easily withdrawn.

Having thus described our invention, what we claim is:—

A vehicle comprising a body composed of two parts hinged together at the center, a non-turning axle suitably connected to one part, a similar non-turning axle for the other part, and a pivotal connection between said last named axle and the body, the axis of the said pivotal connection extending longitudinally of the body part, substantially as described.

In testimony whereof, we affix our signatures in presence of two witnesses.

JOSEPH R. HOLLAND.
HARRY SILVER.

Witnesses:
JAMES F. PETTIT,
ISAAC C. GARROW.